United States Patent [19]

Ledermann et al.

[11] Patent Number: 5,133,270
[45] Date of Patent: Jul. 28, 1992

[54] BANDER ASSEMBLY FOR AN AGRICULTURAL IMPLEMENT

[75] Inventors: Donald L. Ledermann, Darien; Robert C. Lane, Bolingbrook; Keith W. Wendte, Lemont, all of Ill.

[73] Assignee: J. I. Case Company, Racine, Wis.

[21] Appl. No.: 567,971

[22] Filed: Aug. 15, 1990

[51] Int. Cl.$^5$ .............................................. A01C 15/00
[52] U.S. Cl. ................................... 111/130; 239/689; 239/553.5
[58] Field of Search ................... 111/130, 11, 12, 175, 111/176; 239/498, 502, 590, 590.5, 597, 689, 553.3, 568, 650, 553.5

[56] References Cited

U.S. PATENT DOCUMENTS

| | | | |
|---|---|---|---|
| 1,802,059 | 4/1931 | Macjejski | 111/130 X |
| 2,990,186 | 6/1961 | Gandrud | 239/689 X |
| 3,074,727 | 1/1963 | Sosalla et al. | 239/689 X |
| 3,229,857 | 1/1966 | Kirschmann | 111/130 X |
| 4,185,780 | 1/1980 | Duchene et al. | 239/590.5 X |
| 4,971,255 | 11/1990 | Conrad | 239/650 |

FOREIGN PATENT DOCUMENTS

| | | | |
|---|---|---|---|
| 225864 | 9/1910 | Fed. Rep. of Germany | 111/130 |
| 2841406 | 4/1979 | Fed. Rep. of Germany | 239/689 |
| 2390892 | 1/1979 | France | 239/689 |
| 594914 | 2/1978 | U.S.S.R. | 111/175 |
| 1113019 | 9/1984 | U.S.S.R. | 111/11 |

*Primary Examiner*—Randolph A. Reese
*Assistant Examiner*—Jeffrey L. Thompson
*Attorney, Agent, or Firm*—Dressler, Goldsmith, Shore, Sutker & Milnamow, Ltd.

[57] ABSTRACT

A bander assembly for effecting a substantially even distribution of granular or particulate matter across a relatively wide band. The bander assembly includes a housing defining a throat section and a distributor section. The throat section has a series of baffles arranged toward one end thereof for agitating the granular material as it flows therepast. A series of deflectors are arranged in the distributor section for deflecting the granular material into a wide band having a substantially even or equal distribution thereacross. The present invention also relates to a method for effecting a substantially even or equal distribution of granular material from a bander assembly.

6 Claims, 2 Drawing Sheets

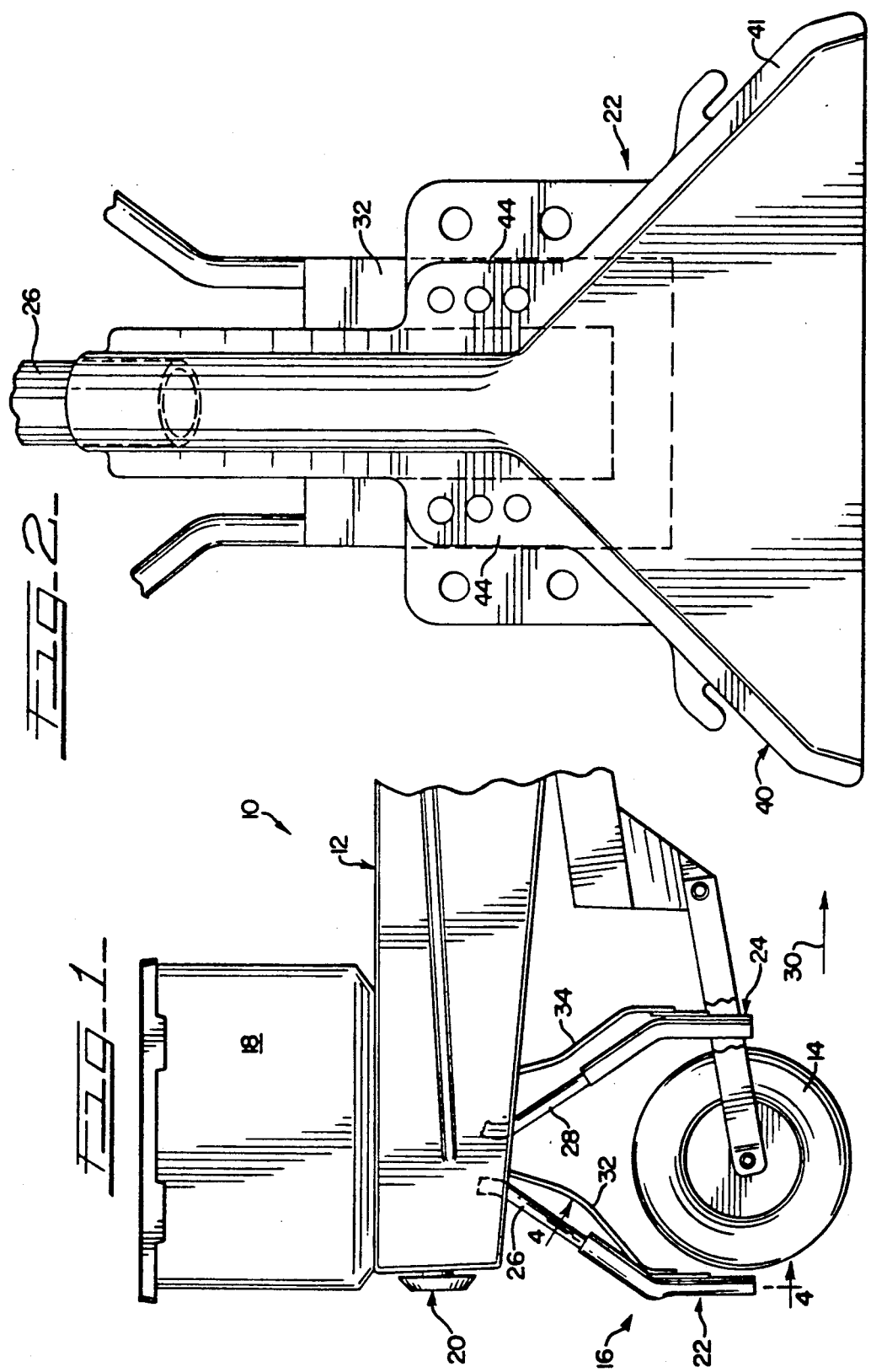

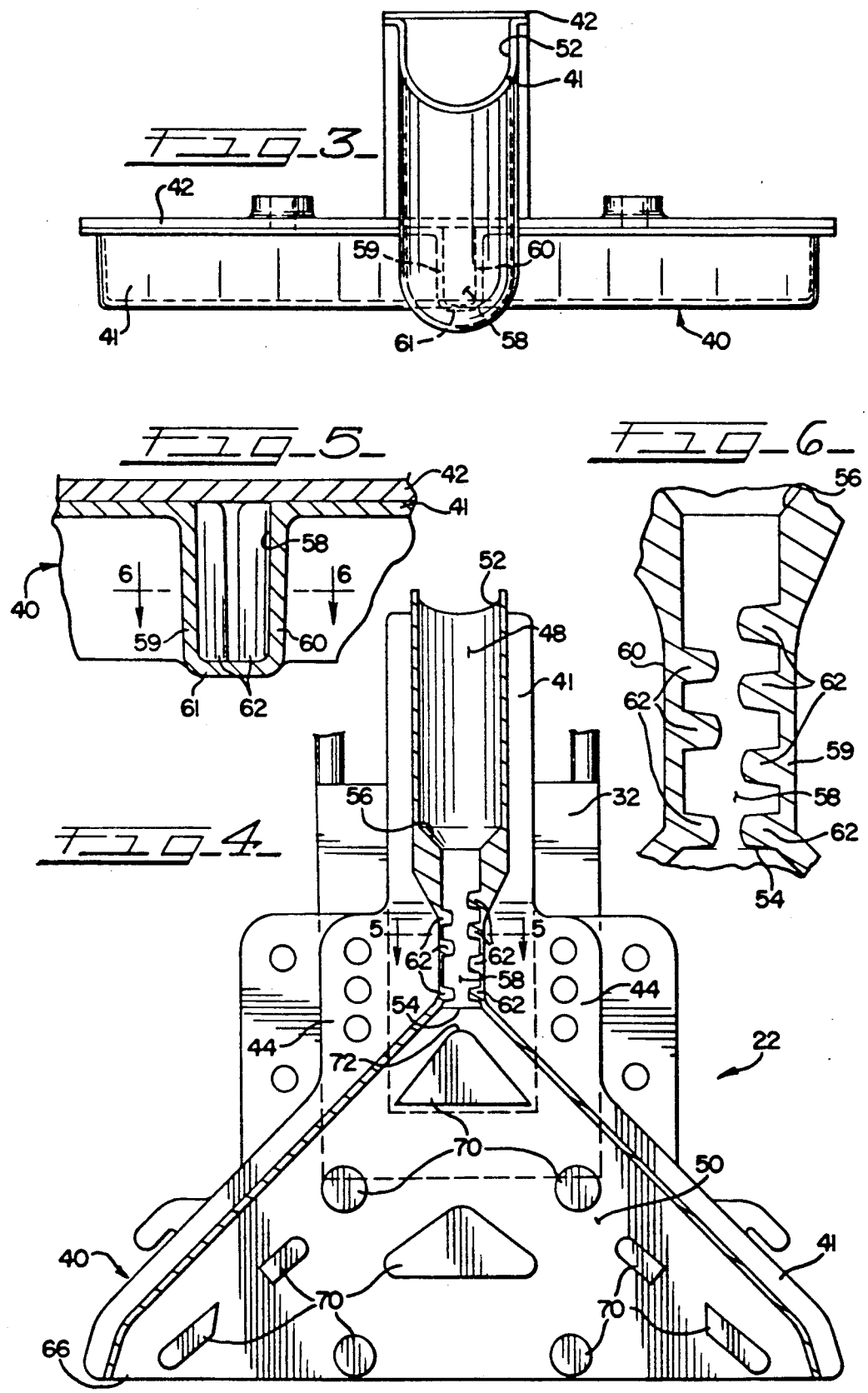

BANDER ASSEMBLY FOR AN AGRICULTURAL IMPLEMENT

FIELD OF THE INVENTION

This invention generally relates to agricultural dispensing mechanisms and, more particularly, to a bander assembly for effecting a substantially even distribution of granular material across a wide band.

BACKGROUND OF THE INVENTION

Agricultural implements such as planters for corn, soybeans, potatoes, and etc. are well known in the art. An example of such an implement is a 900 Series Planter manufactured and sold by J. I. Case Company of Racine, WI.

Most planter manufacturers provide an increased selection of planter sizes and styles to match a variety of tillage practices, acreages and terrains. Trailing rigid, mounted vertical fold and mounted rigid types of planters are available in 4, 6, 8 and 12 row narrow and wide versions. Each row unit on the planter prepares a seedbed environment conducive to fast germination and substantially uniform seedling emergence.

A conventional planter includes a frame with two or more carrying wheels depending upon the size of the frame. Each row unit is connected to the frame and typically includes a seed hopper, double disk openers for penetrating the soil and opening a seed trench whereinto a seed from the seed hopper is deposited, covering disks mounted behind the openers for returning soil to the seed trench, and a press wheel for sealing the closed seed trench and firming the furrow thereby substantially eliminating air pockets and promoting optimum seed germentation.

Each row unit may further include an apparatus for applying or dispensing a dry chemical granular material including fertilizers, herbicides, insecticides, nematocides, and/or fungicides to the seedbed. Such an apparatus typically includes a chemical hopper mounted on the planter frame, a metering mechanism for controlling the flow rate of granular chemical material from the hopper, and one or more bander assemblies for distributing or dispensing the chemical granular material across a band. One bander assembly is normally arranged forwardly of the press wheel and a second bander assembly is normally arranged rearwardly of the press wheel in the direction of planter travel.

Preferably, the metering mechanism is variably adjustable to control the flow rate of the chemical granular material to the bander assemblies. In the case of corn, for example, an insecticide application rate as low as 3 pounds per acre can be used wherein a herbicide application may involve application rates of up to about 40 pounds per acre.

Notwithstanding the material flow rate thereto, the purpose of the bander assembly is to evenly distribute the chemical granular material across the entire band width. A typical bander assembly includes a housing which is fixed to the implement or planter frame and which defines a generally vertical flow path for the granular material. The housing on a typical bander assembly defines a throat section wherein the granular material is received and a distributor section connected downstream of the throat section.

The throat section is suitably connected as by flexible tubing or the like to the metering mechanism. The distributor section of the band assembly has a series of deflectors arranged therewithin for deflecting the chemical granular material into a wide band extending across an egress opening defined by the housing of the bander assembly. It is common for each bander assembly to have a band width extending between 9 and 14 inches.

A bander assembly typically works well when properly affixed to and the implement or planter is operated on substantially level or flat ground surfaces. Even distribution problems arise, however, when the orientation of the bander assembly inadvertently or otherwise shifts relative to a predetermined reference plane. Operation of the planter on inclined or sloped ground surfaces can also adversely effect performance of the bander assembly. When either or both of these conditions arise, the disbursement of granular material from the bander assembly narrows and is generally concentrated within a smaller band. As will be appreciated, a concentration of any one or more of the chemical materials mentioned above will detract from usefulness of the metering mechanism and, depending on the concentration, will destroy or inhibit seed germination.

During operation of the agricultural implement, inadvertent shifting of either or both bander assemblies is a typical occurrence. Moreover, the planter is not always operated on level ground. It will, therefore, be appreciated that there is both a need and a desire for a bander assembly which is not as sensitive to inadvertent displacement thereof relative to a predetermined plane or operation of the implement or planter on a hill or sloped incline.

SUMMARY OF THE INVENTION

In view of the above, and in accordance with the present invention, there is provided a bander assembly capable of effecting a substantially even distribution of a dry granular or particulate matter across a relatively wide band. When attached to an agricultural implement or planter, the bander assembly is effective to evenly disburse chemical granular material received from a metering mechanism across a wide band in the range of about 8 inches to about 15 inches. The bander assembly provides an even distribution even when the planter is operated on a slanted ground contour such as a hillside or the bander assembly is displaced relative to a predetermined reference plane.

The bander assembly of the present invention includes a vertically elongated housing defining a throat section and a distributor section which is arranged downstream of the throat section. The throat section has a reduced cross sectional area toward one end thereof. As the granular material moves through the throat section and before exiting into the distributor section, the granular material is agitated by a series of baffles arranged in the reduced cross-sectional area of the throat section. In the distributor section, which preferably has a progressively increasing cross-sectional area in a downstream direction, a series of deflectors serve to deflect the granular material into a wide band having a substantially even distribution thereacross. An outlet defined by the distributor section of the bander assembly housing defines the width of the band.

The elongated housing of the bander assembly defines a generally vertical flow path for the granular material and is preferably configured with attachment flanges to facilitate attachment of the bander assembly to the implement. The housing of the bander assembly is affixed to the planter relative to a predetermined and generally vertical reference plane. When attached to an agricultural implement such as a planter, granular material is received at an inlet end of the throat section and is exhausted at a discharge end into the distributor section. In the illustrated embodiment, the distributor section has a generally triangularly shaped configuration.

The purpose of the baffles is to direct the granular material away from sidewalls of the throat section and toward a centerline of an uppermost deflector in the distributor section such that a substantially equal distribution of the granular material is effected on opposite sides of the deflector. In the illustrated embodiment, the baffles in the throat section of the bander assembly comprise a series of offset and confronting projections. These projections are preferably arranged in the reduced cross-sectional area of the throat section and are configured to define a sinuous path for the granular material to flow through. In a most preferred form, the reduced cross-sectional area of the throat section has a generally U-shape and the baffles for agitating the granular material extend generally parallel to the side walls of the cross-sectional area in the throat section of the bander assembly.

The deflectors in the distributor section of the bander assembly are arranged at different vertical levels for deflecting the granular material received from the throat section into a wide band having a substantially even distribution of granular material thereacross. In the preferred embodiment, the deflectors are different sizes and shapes depending upon their position or level within the distributor section. At least one of the deflectors preferably has a generally triangularly shaped configuration. Preferably, the uppermost deflector arranged closest to the throat section defines a generally curved surface which is centrally arranged on the vertical flow path defined by the housing and in confronting relation to the outlet of the throat section.

The present invention is also concerned with a method for effecting a substantially even distribution of granular material across a wide band defined by a bander assembly. As discussed, the bander assembly comprises an elongated housing having a throat section and a distributor section arranged downstream of the throat section. Preferably, the throat section has a reduced cross-sectional area toward a lower end thereof. The method for effecting a substantially even distribution includes the steps of agitating the granular material toward a lower end of the throat section before it flows into the distributor section; and, deflecting the agitated granular material received from the throat section in the distributor section into a wide band having a substantially even distribution thereacross.

From the above, it should be understood that when the bander assembly is secured to an agricultural implement such as a planter, the bander assembly housing defines a generally vertical flow path for the granular material. The baffles in the throat section of the bander assembly agitate the granular material before it exits to the distributor section. The deflectors in the distributor section deflect the granular material into a wide band.

Regardless of granular material flow from the metering mechanism, inadvertent displacement of the bander assembly housing relative to the reference plane, or operation of the planter or on inclined slopes or ground contours, the combination of agitating the granular flow with subsequent deflection into a wide band results in a substantially even distribution across the entire width of the band. Accordingly, maximum use of the metering mechanism is realized and appropriate distribution of the granular material across the entire band width is achieved.

Numerous other features and advantages of the present invention will become readily apparent from the following detailed description, the accompanying drawings, and the appended claims.

BRIEF DESCRIPTION OF THE DRAWINGS

FIG. 1 is a side elevational view of an agricultural implement such as a planter row unit with bander assemblies incorporating principles of the present invention attached thereto;

FIG. 2 is an enlarged end view of a bander assembly according to the present invention;

FIG. 3 is a plan view of a bander assembly according to the present invention;

FIG. 4 is a sectional view of a bander assembly taken along line 4—4 of FIG. 1;

FIG. 5 is an enlarged sectional plan view taken along line 5—5 of FIG. 4; and

FIG. 6 is an enlarged sectional view of a lower end of a throat section of a bander assembly.

DETAILED DESCRIPTION OF THE PRESENT INVENTION

While the present invention is susceptible to embodiment in various forms, there is shown in the drawings, and will hereinafter be described, a preferred embodiment of the invention, with the understanding that the present disclosure is to be considered as an exemplification of the invention and is not intended to limit the invention to the specific embodiment illustrated.

Referring now to the drawings, wherein like reference numerals indicate like parts throughout the several views, there is shown a planter which is depicted only fragmentarily and is seen as represented in its entirety in FIG. 1 by reference numeral 10. Planter 10 is preferably of the type manufactured and sold by J. I. Case Company of Racine, Wisconsin as a Series 900 Planter.

As is conventional, such a planter includes a series of row units which operate in combination with each other to plant parallel rows of crops such as corn, soybeans, and etc. Because the row units are substantially similar, only one such mechanism has been schematically illustrated with the understanding that the other row units are similarly constructed.

Each row unit includes a frame 12 which is mounted for movement over a field by wheels (not shown) and which is provided with a resiliently biased press wheel 14. Each row unit further includes an apparatus 16 for applying or dispensing a dry chemical granular material to the seedbed. The chemical dispensing apparatus 16 includes a hopper 18, a driven metering mechanism 20, and bander assemblies 22 and 24. As is conventional, the agricultural dispensing mechanism is operable to dispense fertilizers, herbicides, insecticides, nematocides, fungicides or other pesticides which are mixed with a suitable carrier, such as sand, crushed rock, crushed corn and etc. to the seed bed or ground.

The hopper 18 is a conventional structure wherein the chemical granular material is stored. As illustrated in FIG. 1, hopper 18 is suitably mounted on the frame 12 of each row unit. Likewise, the metering mechanism 20 is a conventional structure used to meter or regulate the flow of chemical granular material from the hopper 18 to the bander assemblies 22 and 24 through suitable delivery tubes 26 and 28, respectively.

As is conventional, the bander assemblies are arranged on forward and reverse sides of the press wheel 14, in the direction of travel of the planter mechanism as indicated by arrow 30. The bander assemblies 22 and 24 are positioned on the row unit by vertical supports 32 and 34, respectively, depending from frame 12 of the planter. Except for the granular material band width disbursement therefrom, the bander assemblies 22 and 24 are substantially similar in construction. Accordingly, only a detailed description of bander assembly 22 will be provided with the understanding that the construction of bander assembly 24 is substantially similar thereto.

Turning to FIG. 2, each bander assembly includes an elongated housing 40 which defines a generally vertical flow path for the chemical granular material passing therethrough. As illustrated in FIG. 3, housing 40 of each bander assembly is preferably fabricated as a two-piece structure including a base 41 and a releasable cover 42 secured to base 41. Both the base 41 and cover 42 are preferably molded from suitable plastic materials.

As illustrated in FIGS. 2 and 4, base 41 is configured with apertured and laterally spaced attachment flanges 44 which facilitate attachment of the bander assembly to the frame 12 of the planter. More particularly, the flanges 44 facilitate attachment of the housing 40 of the bander assembly to a respective vertical support and relative to a predetermined and generally vertical reference plane extending substantially normal to a generally flat ground surface over which the planter moves during operation.

As illustrated in FIG. 4, housing 40 of each bander assembly defines a throat section 48 and a distributor section 50 located downstream of the throat section 48. The throat section 48 receives granular material at an inlet end 52 thereof and exhausts granular material to the distributor section 50 at a discharge end 54. Downstream of the inlet end 52, the throat section 48 has a transition section 56 which leads to a reduced cross-sectional area 58 provided toward the discharge end of the throat section 48.

In the transition section 56, opposed walls of housing 40 converge toward each other and are angled relative to the vertical flow path for the granular material. In a preferred form, opposed walls on the base 41 of housing 40, in the transition section 56, are angled such that an included angle of about 50 degrees is formed between each angled wall and the generally vertical flow path to facilitate downward gravitational flow of granular material toward the distributor section.

In a most preferred form, the reduced cross-sectional area 58 has a width in the range of about 0.562 to about 0.650 inches and extends about 2.50 inches along the vertical flow path of granular material travel. As illustrated in FIGS. 3 and 5, in the cross-sectional area 58, base 41 of housing 40 has a generally U-shaped configuration including sidewalls 59 and 60 which extend generally parallel relative to each other and are joined by a wall 61. The cover 42 closes the open side on the base 41.

A salient feature of the present invention concerns the provision of suitable means for agitating granular material toward a lower end of the throat section 48 before it is exhausted to the distributor section and for directing the granular material toward a centerline of an uppermost deflector arranged in the distributor section of the housing. In the preferred embodiment, such agitating means includes a series of baffles 62 arranged in the reduced cross-sectional area 58 toward the outlet end 54 of the throat section 48 for agitating granular material as it flows therepast.

As illustrated in FIGS. 5 and 6, the baffles 62 include a series of confronting projections. Notably, the majority of the projections are vertically offset relative to each other to define a sinuous path for and which are positioned relative to each other to agitate the granular material flowing into the distributor section 50. The two lowermost and confronting projections may be disposed at substantially the same vertical position along the length of the throat section.

As illustrated, each projection extends away from and generally parallel to the respective sidewalls 59 and 60 of the throat section. Each of the projections extend away from a respective side wall for a distance ranging between about 0.115 inches and about 0.250 inches. In a most preferred embodiment, the majority of the projections extend away from a respective side wall for a distance of about 0.196 inches. Moreover, each projection preferably has about a 0.200 inch thickness.

Returning to FIG. 4, the distributor section 50 of each bander assembly preferably has a progressively increasing cross-sectional area or width in the downstream direction. In the illustrated embodiment, the distributor section has a generally triangularly shaped configuration. At its lowermost end, housing 40 of the bander assembly defines an outlet 66. The outlet 66 defined by distributor section 50 defines the width of the granular material distribution band disbursed by the bander assembly. In a preferred form, the outlet 66 ranges between about 9 inches and about 14 inches.

A series of deflectors 70 are arranged at different levels in the distribution section 50 of each bander assembly. The deflectors 70 may have different configurations depending on their vertical placement within the distribution section of the bander assembly. As shown, at least one of the deflectors 70 has a generally triangular shape. Notably, however, the uppermost deflector, or that which is arranged closest to the outlet end 54 of throat section 48 defines a generally curved surface 72 which is centrally arranged on the vertical flow path defined by the housing 40 and in confronting relation to the outlet 54 of the throat section 48.

During operation, a regulated or metered flow of granular chemical material is delivered to the inlet end 52 of the throat section 48 of each bander assembly from the metering mechanism 20. The granular chemical material gravitationally flows along the generally vertical flow path toward the outlet 66 defined by the bander assembly.

Along its path of travel and prior to its discharge into the distributor section 50, the granular material is agitated so as to disturb its flow. In the illustrated embodiment, baffles 62 combine to define a sinuous path for the granular material. The granular chemical material is disturbed or agitated as it flows past the baffles. In addition to agitation, the lowermost baffles direct the granular material away from the sidewalls of the throat section and toward a centerline of the uppermost baffle such that a substantially equal distribution of granular material is effected on opposite sides of the deflector.

The curved surface 72 defined on the uppermost deflector 70 provides substantially centerline contact with the granular chemical material exhausted from the outlet 54 of the throat section 48. As the granular material gravitationally falls toward the outlet 66, other deflectors 70 serve to further divide and effect a substantially even distribution of granular material across a wide band defined by the distribution section 50 of the bander assembly.

Another aspect of the present invention relates to a method for effecting a substantially even distribution of granular material across a wide band defined by a bander assembly, and wherein the bander assembly comprises an elongated housing 40 having a throat section 48 and a distributor section 50 arranged downstream of the throat section, with the throat section having a reduced cross-sectional area 58 toward a lower end thereof. The method of the present invention comprises the steps of: agitating the granular material in a lower area of the throat section 48 before it flows into the distributor section 50; and, deflecting the agitated granular material received from the throat section in the distributor section into a wide band having a substantially even distribution thereacross.

As will be appreciated from the above, the present invention provides a bander assembly which effects an even distribution across substantially the entire band width of the bander assembly. By agitating the granular material at the lower end of the throat section, a greater tolerance in attaching the bander assembly to the implement is allowed while maintaining an even distribution across the entire band width. The present invention also offers an even distribution across the entire width of the bander assembly notwithstanding the flow rate of the material from the metering mechanism. Moreover, the present invention offers a substantially even distribution of granular material across the band width regardless of the carrier used for the chemical material.

While the present invention is susceptible of embodiment in various forms, there is shown in the drawings, and will hereinafter be described, a preferred embodiment of the invention with the understanding that the present disclosure is to be considered as an exemplification of the invention and is not intended to limit the invention to the specific embodiment illustrated.

What is claimed is:

1. A bander assembly mounted on an agricultural implement and operative to distribute agricultural granular materials substantially evenly across a predetermined band on a ground surface, said bander assembly comprising:

an elongated housing connected to said implement relative to a predetermined reference plane and defining a generally vertical flow path for said granular material, said housing having a throat section which receives granular material at an inlet end and which opens to a generally U-shaped reduced cross-sectional area leading to a discharge end from which granular material is exhausted into a distributor section;

baffle means arranged adjacent the discharge end of said throat section for agitating granular material flowing therepast, said baffle means including a series of vertically offset cantilevered projections extending from said walls of said reduced cross-sectional area and whose free material engaging surface ends define generally linear surfaces extending generally parallel to each other; and deflector means arranged in the distributor section of said housing for deflecting granular material received from said baffle means into a wide band having a substantially even distribution thereacross, and wherein an outlet defined by said distributor section defines the width of said band.

2. The bander assembly according to claim 1 wherein said baffle means combine to define a sinuous path of ravel for said granular material, said projections being positioned relative to each other to agitate the granular material flowing into said distributor section such that a substantially even distribution across said band is effected when said housing is offset from said predetermined recreance plane.

3. The bander assembly according to claim 1 wherein said deflector means comprise a series of deflectors arranged at different levels, with an uppermost deflector defining a generally curved surface which is centrally arranged on the vertical flow path defined by said housing and in confronting relation to the discharge end of said throat section.

4. A bander assembly through which granular material is adapted to flow, said bander assembly comprising:

a housing defining a vertically elongated path through which the granular material is adapted to flow and including a throat section and distributor section, said throat section having an inlet leading to a transition area with an inwardly sloping surface configuration which substantially narrows the throat section into a vertically elongated and reduced cross-sectional area having a discharge end opening to said distributor section, said throat section further including baffle means formed as an integral part of said housing and arranged within the reduced cross-sectional area for defining a sinuous vertical path providing agitation to granular material flowing therethrough; and deflector means arranged in the distributor section of said housing for effecting deflection of granular material received from said throat section into a relatively wide band.

5. The bander assembly according to claim 4 wherein said baffle means comprises a series of vertically offset projections arranged in generally parallel and confronting relation relative to each other, with lowermost confronting projections being arranged substantially coplanar relative to each other.

6. The bander assembly according to claim 4 wherein said housing is a two-piece structure comprised of a base and a cover releasably secured to the base.

* * * * *